(12) United States Patent
Anderson

(10) Patent No.: US 7,797,000 B2
(45) Date of Patent: Sep. 14, 2010

(54) SYSTEM FOR AUTOMATICALLY DETERMINING CELL TRANSMITTER PARAMETERS TO FACILITATE THE LOCATION OF WIRELESS DEVICES

(75) Inventor: Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 388 days.

(21) Appl. No.: 11/607,420

(22) Filed: Dec. 1, 2006

(65) Prior Publication Data

US 2008/0132247 A1    Jun. 5, 2008

(51) Int. Cl.
*H04M 11/04* (2006.01)
*H04W 24/00* (2009.01)

(52) U.S. Cl. .............. 455/456.2; 455/404.2; 455/456.1; 455/456.3

(58) Field of Classification Search .............. 455/456.2, 455/404.2, 456.1, 456.3
See application file for complete search history.

(56) References Cited

U.S. PATENT DOCUMENTS

| | | | |
|---|---|---|---|
| 5,045,861 A | 9/1991 | Duffett-Smith | 342/457 |
| 5,293,645 A | 3/1994 | Sood | 455/456.2 |
| 5,646,632 A | 7/1997 | Khan et al. | 342/375 |
| 6,094,168 A | 7/2000 | Duffett-Smith et al. | 342/463 |
| 6,529,165 B1 | 3/2003 | Duffett-Smith et al. | 342/463 |
| 6,812,824 B1* | 11/2004 | Goldinger et al. | 340/10.1 |
| 6,937,866 B2 | 8/2005 | Duffett-Smith et al. | |
| 6,952,158 B2 | 10/2005 | Kennedy, Jr. | |
| 7,116,988 B2 | 10/2006 | Dietrich et al. | 455/456.1 |
| 7,123,928 B2* | 10/2006 | Moeglein et al. | 455/456.3 |
| 7,369,859 B2 | 5/2008 | Gallagher | |
| 7,453,912 B2 | 11/2008 | Laroia et al. | |
| 2001/0034223 A1 | 10/2001 | Rieser et al. | 455/404.2 |
| 2002/0094820 A1 | 7/2002 | Keranen et al. | |
| 2003/0125044 A1* | 7/2003 | Deloach et al. | 455/456 |
| 2004/0046693 A1* | 3/2004 | Ogino et al. | 342/357.08 |
| 2005/0003831 A1 | 1/2005 | Anderson | 455/456.1 |
| 2005/0003832 A1 | 1/2005 | Osafune et al. | 455/456.1 |
| 2006/0019679 A1 | 1/2006 | Rappaport et al. | 455/456.5 |

(Continued)

FOREIGN PATENT DOCUMENTS

WO    WO 2008/085439    7/2008

(Continued)

OTHER PUBLICATIONS

"Patent Cooperation Treaty: International Search Report," International Searching Authority, May 16, 2008, 12 pages.

(Continued)

*Primary Examiner*—Kamran Afshar
*Assistant Examiner*—Munsoon Choo
(74) *Attorney, Agent, or Firm*—Woodcock Washburn LLP

(57) ABSTRACT

Several techniques for locating wireless devices involve the Mobile Stations (MS) making measurements of the signals transmitted by geographically distributed base stations within a wireless network. If some key site information is known about these transmitters, such as the transmitter location, transmit signal power, signal propagation, and transmit signal timing, measurements of these transmit signals by a MS can be used to determine the position of the MS. An automatic method to detect transmitters, identify key transmitter information, and utilize the base station transmit signals to perform location is presented. In addition, this method facilitates the use of cell site transmit signals that are part of multiple wireless networks.

63 Claims, 4 Drawing Sheets

U.S. PATENT DOCUMENTS

| | | | |
|---|---|---|---|
| 2006/0025154 A1 | 2/2006 | Alapuranen et al. | 455/456.1 |
| 2006/0025158 A1* | 2/2006 | Leblanc et al. | 455/456.2 |
| 2006/0293066 A1* | 12/2006 | Edge et al. | 455/456.3 |
| 2007/0155401 A1 | 7/2007 | Ward et al. | |
| 2008/0095131 A1* | 4/2008 | Aljadeff et al. | 370/342 |
| 2008/0132244 A1 | 6/2008 | Anderson | |

FOREIGN PATENT DOCUMENTS

| | | |
|---|---|---|
| WO | WO 2008/070494 | 8/2008 |

OTHER PUBLICATIONS

Patent Cooperation Treaty, "International Search Report / Written Opinion," International Searching Authority, May 20, 2008, 11 pages.

United States Patent and Trademark Office: Non-Final Office Action dated Jul. 23, 2009, U.S. Appl. No. 11/616,790.

PCT Written Opinion of the International Searching Authority mailed May 16, 2008, in corresponding International Application PCT/US07/85729.

PCT International Preliminary Report on Patentability issued Jun. 30, 2009, in corresponding International Application PCT/US2007/026255.

* cited by examiner

SYSTEM FOR AUTOMATICALLY DETERMINING CELL TRANSMITTER PARAMETERS TO FACILITATE THE LOCATION OF WIRELESS DEVICES

TECHNICAL FIELD

The present invention relates generally to the field of wireless communications, and more specifically to the location of devices within the coverage area of a wireless communications network.

BACKGROUND

Several techniques for locating wireless devices involve the Mobile Station (MS) making measurements of the signals transmitted by the base stations of a wireless communication network. (The term MS or Mobile Station, as used herein, refers to any type of wireless phone or other mobile device having a radio communications capability.) These techniques are known by the acronyms EOTD, AFLT, OTD and ECID.

Enhanced Observed Time Difference (EOTD) is a location technique defined in the ETSI 3GPP Technical Specification 43.059 in which a GSM MS makes relative time difference measurements of the beacon signals transmitted by geographically distributed base stations, where these measurements are used to compute a position.

Advanced Forward Link Trilateration (AFLT) is a technique defined in the TIA IS-95 and CDMA 2000 standards in which a CDMA MS makes relative time difference measurements of the pilot signals transmitted by geographically distributed CDMA base stations, where these measurements are used to compute a location.

Observed Time Difference (OTD) is a location technique defined in the ETSI 3GPP Technical Specification 23.271 in which the User Equipment (UE), which is essentially a mobile station in a UMTS network, makes relative time difference measurements of the signals transmitted by geographically distributed Node Bs (base stations in a UMTS system), where these measurements are used to compute a location.

Enhanced Cell Identification (ECID) is a technique used to locate GSM MSs in which the MSs perform received power level measurements of the signals transmitted by geographically distributed GSM base stations, where these measurements are used to compute locations.

All of these location techniques involve a MS measuring signals whose characteristics vary as a function of the distance between the MS and the Base Stations transmitting the signals. In addition, all of these location techniques require knowledge of key cell site information. Such key cell site information may include cell identification information and transmit antenna location. In addition, some of these location techniques require additional information about the transmitters, such as transmitter signal timing, signal transmit power, and signal propagation or signal loss in the environment. This information can be difficult to obtain from wireless network operators because it is dynamic and distributed across multiple data bases. This information may be difficult to obtain and maintain across multiple wireless network operators, as some operators may not be willing to cooperate and provide this information. The accuracy of each of the location techniques described above will be improved if a larger number of the base station signals are used in the location solution, which is possible when the transmit signals across multiple wireless networks are available. The accuracy of each of these techniques is dependent upon the number and quality of the signals available for measurement, and so the ability for a location solution to utilize these signals across multiple wireless networks will provide better performance than could be achieved if the measurements were limited to the signals of a single wireless network.

One goal of the present invention is to provide an automatic way to detect the existence of one or more useful wireless transmitters, determine the cell identification information so that each transmitter can be referred to later, determine the transmitter antenna locations, determine the transmitter timing, determine the transmitter power level, and determine the signal power loss as a function of location, so that any such wireless transmitter can be used to locate mobile stations.

SUMMARY

The following summary is intended to explain several aspects of the illustrative embodiments described in greater detail below. This summary is not intended to cover all inventive aspects of the disclosed subject matter, nor is it intended to limit the scope of protection of the claims set forth below.

In one illustrative embodiment, the present invention provides a system for locating a mobile wireless device. The system includes a location processing node, at least one wireless device, and a server. In an exemplary embodiment, the wireless device is configured to communicate with the location processing node via a communications link, and to make scanning measurements of signals from one or more geographically distributed transmitters. Moreover, the at least one wireless device is further configured to assist the location processing node in determining key transmitter information by receiving and measuring characteristics of the signals and providing information about these characteristics via the communications link to the location processing node. The server is configured to communicate with a wireless device to be located, and to cause the wireless device to make signal measurements of signals from one or more transmitters and to provide measurement information to the location processing node. The characteristics measured by the at least one wireless device are useful to determine the key transmitter information.

In an illustrative embodiments, the at least one wireless device is further configured to communicate the key transmitter information to the location processing node, wherein the information may be used by the location processing node to compute the location of one or more wireless devices. In addition, the system is configured to operate with the one or more transmitters, and at least one transmitter is part of a first wireless communications network and a least one transmitter is part of a second wireless communications network. The server may also be configured to communicate via a user plane data channel with the at least one wireless device, and the wireless device may be configured to provide measurement information via the data channel to the location processing node.

The key transmitter information preferably includes cell identification information, which may include at least one member of the group consisting of Cell ID, frequency channel, base station identify code, Cell Global Identity, and Base Station ID. The key transmitter information may also include cell transmitter location information, which may include latitude and longitude, and possibly altitude. In addition, the key transmitter information may include cell transmitter signal timing information, and the signal measurements may include relative signal timing and/or absolute signal timing.

The present invention also provides, and may be embodied in, methods, wireless devices, and computer readable media comprising software for carrying out the functions and activities described herein.

Other aspects and embodiments of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Figure 1:
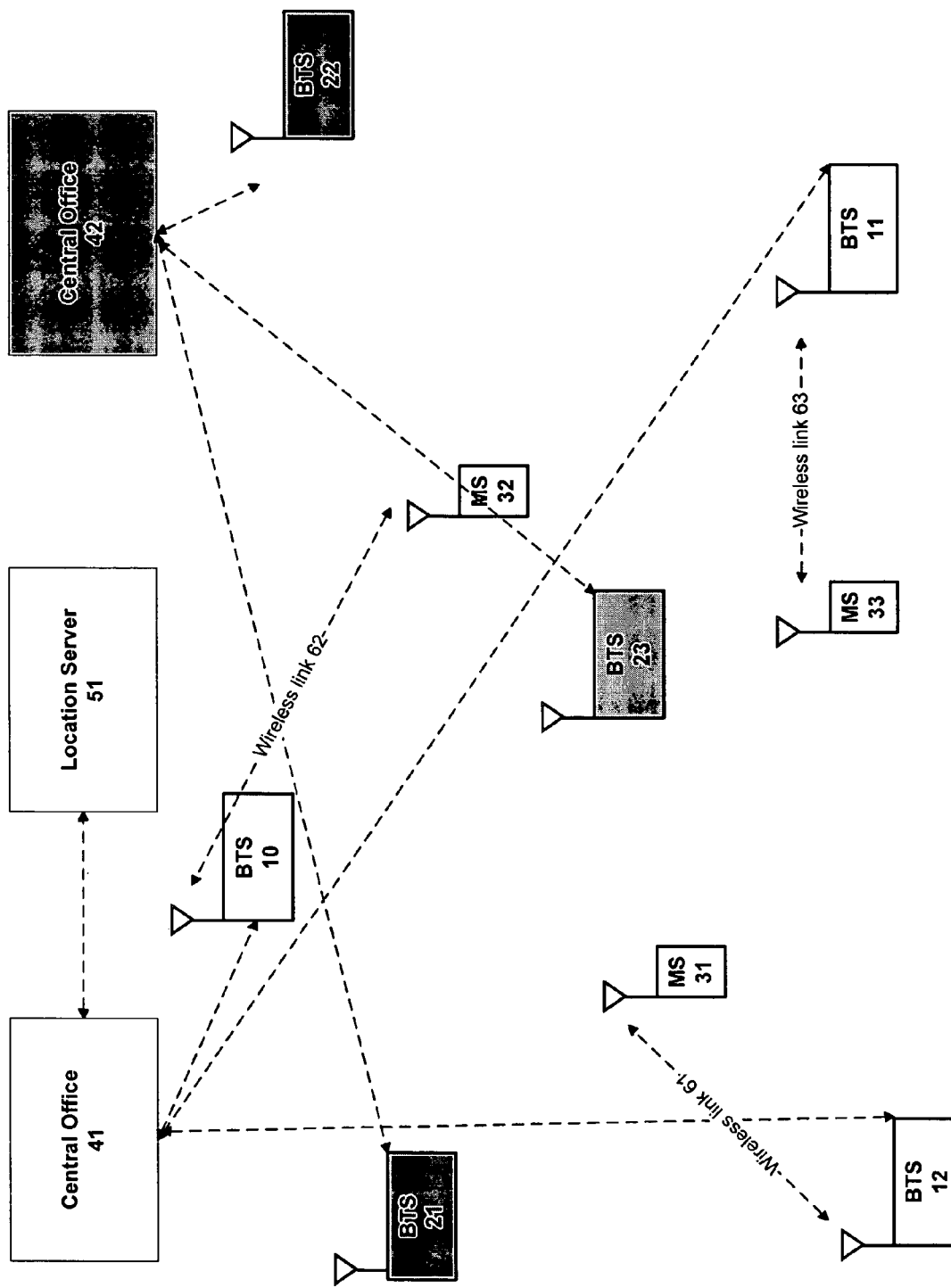
FIG. 1 is a block diagram depicting an environment, including two wireless communications networks, in which the present invention may be deployed.

We will now describe illustrative or presently preferred embodiments of the present invention. First, we provide an overview and then a more detailed description.

Overview

The present invention provides a system for locating devices within the coverage area of a wireless network. The invention may be embodied in a system that employs much of the existing infrastructure in a wireless network. For example, the system may utilize the wireless network to facilitate communication between the MSs and a location server. The system may employ a user-plane, or Secure User-plane (SUPL), connection between the MS and the location server. An example of such a user plane is defined by an Open Mobile Alliance technical standard (see www.openmobilealliance.org).

Co-pending patent application Ser. No. 11/533,310, filed Sep. 19, 2006, entitled "USER PLANE UPLINK TIME DIFFERENCE OF ARRIVAL (U-TDOA)," describes a user plane approach to network-based wireless location. Typical U-TDOA solutions are often based on the control plane architecture, which can require extensive modifications of the mobile network infrastructure in line with the ANSI/3GPP location services standards (for example, ANSI/ETSI J-STD-036 and ANSI ESTI GSM 03.17). The control plane approach involves the use of information conveyed in the control or voice channels (also known respectively as the access channel and traffic channels, among other names) to locate the mobile device. In contrast, in a user plane architecture, the location server can communicate directly with the mobile device via a data or IP (Internet Protocol) link carried by the wireless operator's radio network but not part of the control/voice (or access/traffic) channel structures, thus requiring no modifications to the core or radio network. The '310 application describes a system that may be used to instruct the wireless location system (WLS) how to locate a mobile device (such as an LDP Device, where LDP stands for location device platform). In the control plane approach, the WLS waits for information from the wireless communications network before calculating a position, whether via U-TDOA, Cell-ID, Cell-ID+Timing Advance, or Cell-ID with Power Difference of Arrival. In the user plane approach, the mobile device provides to an LES (also called the Location Enabling Server, or LES) sufficient information over the data channel to perform the location calculation. The information provided to the LES is known to the mobile device (i.e., LDP Device) and this knowledge is leveraged to facilitate the location calculation. In addition, the mobile information can also be used for tasking, for example, to task the U-TDOA/AoA WLS since the information sent over the data connection can include serving cell, neighboring cells, frequency, and hopping pattern information. In the prior control plane approach, this information is obtained from the network via the E5, Lb or Iupc interface (for example) and not from the mobile over a data channel.

FIG. 1 shows an illustrative environment in which the present invention may be used. In this figure, a first wireless network includes a central office 41 and Base Transceiver Stations (BTSs) 10, 11, 12. Mobile devices, or MSs 31, 32, and 33, can communicate voice and data using this first wireless network. The MSs (31, 32, 33) and the location server 51 are connected by an IP connection provided by the first wireless network. In a user-plane solution, an application runs on the MS, which would perform the signal measurements when commanded by the server 51 through the IP connection and report the results of these measurements through the IP connection. The advantage of a user-plane implementation is that it does not require a wireless network operator to place additional features and infrastructure into the wireless network to support location related messaging between the MS and the location server 51. The MSs make measurements of the signals transmitted by BTSs 10, 11, 12 of the first wireless network, as well as the signals transmitted by the BTSs 21, 22, 23 of a second wireless network, which includes a second central office 42. These measurements, along with the derived cell site information, are used to determine the mobile device positions. FIG. 1 also depicts wireless links 61, 62 and 63.

Figure 1A:
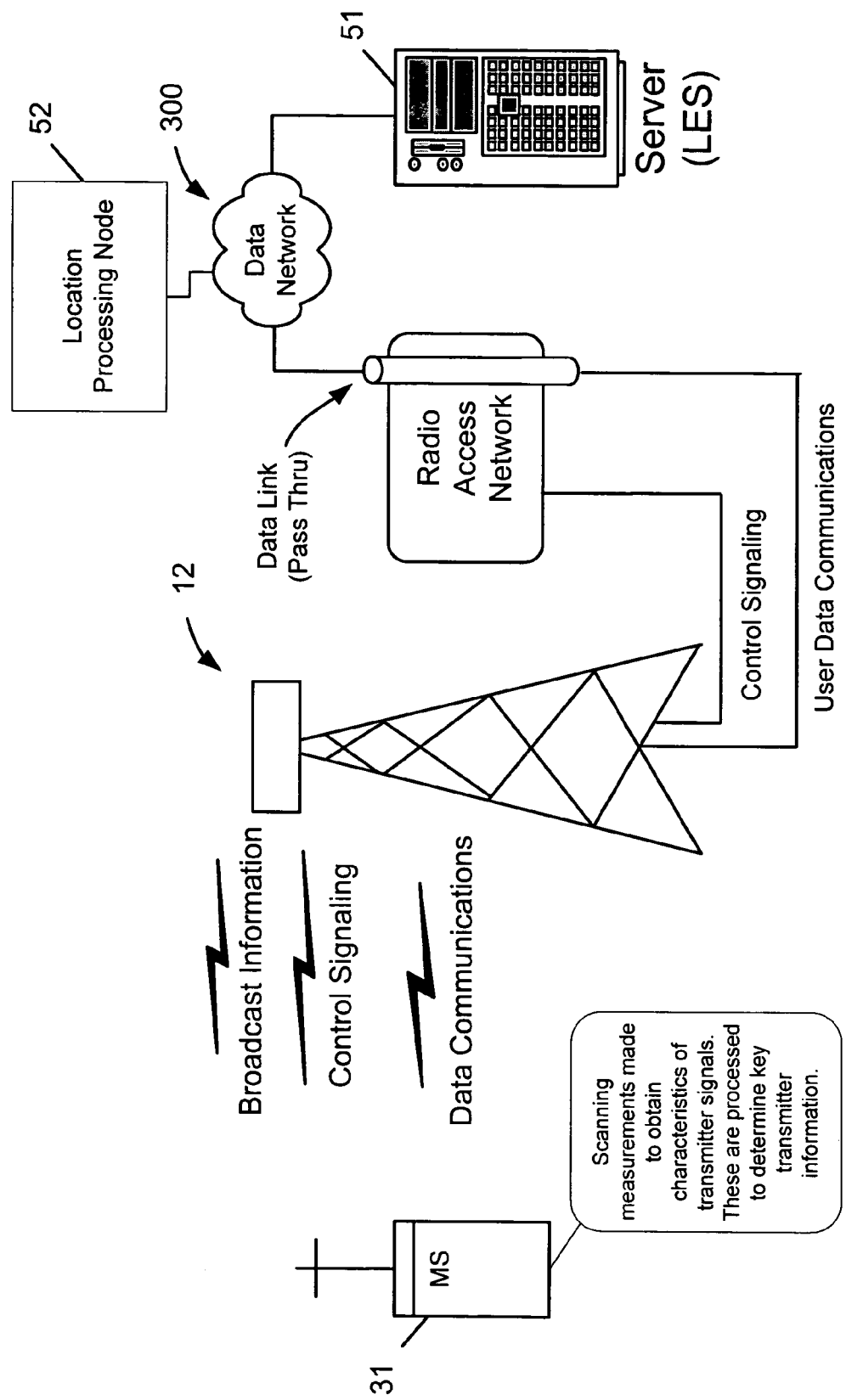
FIG. 1A schematically illustrates how a mobile wireless device (which could be an LDP device or any other kind of MS), may be configured to communicate via a data channel with a server (which could be a Location Enabling Server or other type of server). The server may be configured to communicate via the data channel with wireless devices to be located, and to cause the devices to make measurements of signals from one or more transmitters and to provide measurement information to a location processing node (which could be the same node as the LES, or a different node).

FIG. 1A illustrates how a server and location processing node, which may be part of the server or a different node, may be configured or programmed to communicate with one or more wireless devices over a user plane data link 300. To perform an enhanced network-based location, a MS 31 may be configured to receive broadcast acquisition data, register on the wireless communications system (if required) and then request data service from the wireless network to establish a data link or channel 300 as shown. In contrast to the control channels and signaling of the wireless communications system (the control plane), the data channel 300 (the user plane) supports a modulation to support data transmissions (data signaling is not re-encoded and compressed by the wireless communications system as with voice signaling, but rather passes though the wireless system as shown in FIG. 1A). The payload contents of the data channel 300 do not require examination or modification by the functional elements of the wireless communications system. The data channel payload does not inform, control, or modify the operations of the elements of the wireless communications system as does control channel data. The data channel 300 may be carried as payload in an assigned data channel either as raw binary data or in a voice channel as a series of voice frequency tones. The data connection may be routed by the data network (reference numeral 300 in FIG. 1A) to a server 51 and/or location processing node 52. Upon connection with the server or location processing node, the MS 31 then transmits its data. Similarly, the data channel may be used to transmit commands from a server to the MS.

Exemplary aspects of the inventive system include the following:

1. The key information for each base station transmitter is determined across one or more wireless networks. This key information may include:
    Cell Identification information;
    Transmitter location, including latitude, longitude and altitude;
    Signal timing;
    Signal transmit power; and
    Signal propagation.
2. This key information is provided to a node capable of computing a location. This node could be the MS, the location server, or some other node.
3. The MS to be located makes measurements of transmitted signals. Signal measurements may include timing, power level measurements, or signal to noise ratio measurements.
4. Signal measurements performed by the MS are provided to a node capable of computing a location.

The step of providing information for each base station may include the following steps:

1. Fixed or wireless devices scan for wireless base station signals;
2. Devices determine cell or base station identification information;
3. Devices make measurements of the received base station signals. Such measurements may include signal timing/phase and power level.
4. The key transmitter parameters are determined based on these signal measurements.

This concept is distinct from several location concepts defined in the prior art, which generally require that the transmitter location and timing, and transmit power are known. See, e.g., U.S. Pat. No. 5,293,645 (Sood); U.S. Pat. No. 6,529,165 (Duffet-Smith); U.S. Pat. No. 5,646,632 (Khan); U.S. Pat. No. 5,045,861 (Duffet-Smith); and U.S. Pat. No. 6,094,168 (Duffet-Smith). For example, U.S. Pat. No. 6,529,165 identifies a method to determine the position of a MS, as well as the base station signal timing, through a complex matrix solution. This solution requires the cell IDs and cell positions to be known a priori. The present invention provides for automatic determination of relevant cell site information, which may include identification for the cell sites, positions for the cell transmit antenna, transmit power and signal propagation.

Detailed Description of System for Automatically Determining Cell Transmitter Parameters As discussed above, FIG. 1 is a high level diagram of one presently preferred embodiment. Elements 10, 11, and 12 are BTSs, which are part of a first wireless network. Elements 21, 22, and 23 are BTSs that are part of a second wireless network. Elements 31, 32, and 33 are devices existing within the first wireless network, and these devices are capable of making signal measurements, including time difference and/or power level measurements. The devices could be fixed devices with known position, or mobile devices with known or unknown positions. Elements 41 and 42 are the central office equipment of the first and second wireless networks, and element 51 is a location server, which is connected to the MSs 31, 32, and 33 via a wireless links 61, 62, and 63, through the first wireless network.

Location server 51 tasks MSs 31, 32, and 33 via commands through the wireless network to scan all available wireless bands for base station broadcast signals. In North America, this could include the cellular (800 MHz) band and PCS (1900 MHz) band. In Europe, this could include the GSM (900 MHz) band and the PCN (1800 MHz) band, or the UMTS (2100 MHz) band. In other regions, these bands may be different, and over time the set of bands may change as licenses for wireless service evolve. During this scanning process, the MS will store information for each of the base stations it can detect. The MS may be commanded to scan and report cell information for cells outside of its home network, as these cells are just as useful as the cells of the home network in supporting location related measurements. This cell information may include: cell identification information, broadcast channel number or frequency, received signal power, and relative time difference of received signals. This information may then be provided to the location server 51. If the MS has any other relevant position information, such as a position determined from a built-in GPS receiver, or if the MS's position is fixed and is known, or if the timing of the device can be mapped to timing derived in the device by GPS, this information can be provided to the server as well. This information from many MSs can be collected by the location server 51 and used to determine information that can be used to locate these MSs, and other MSs in the area, in the future.

Figure 2:
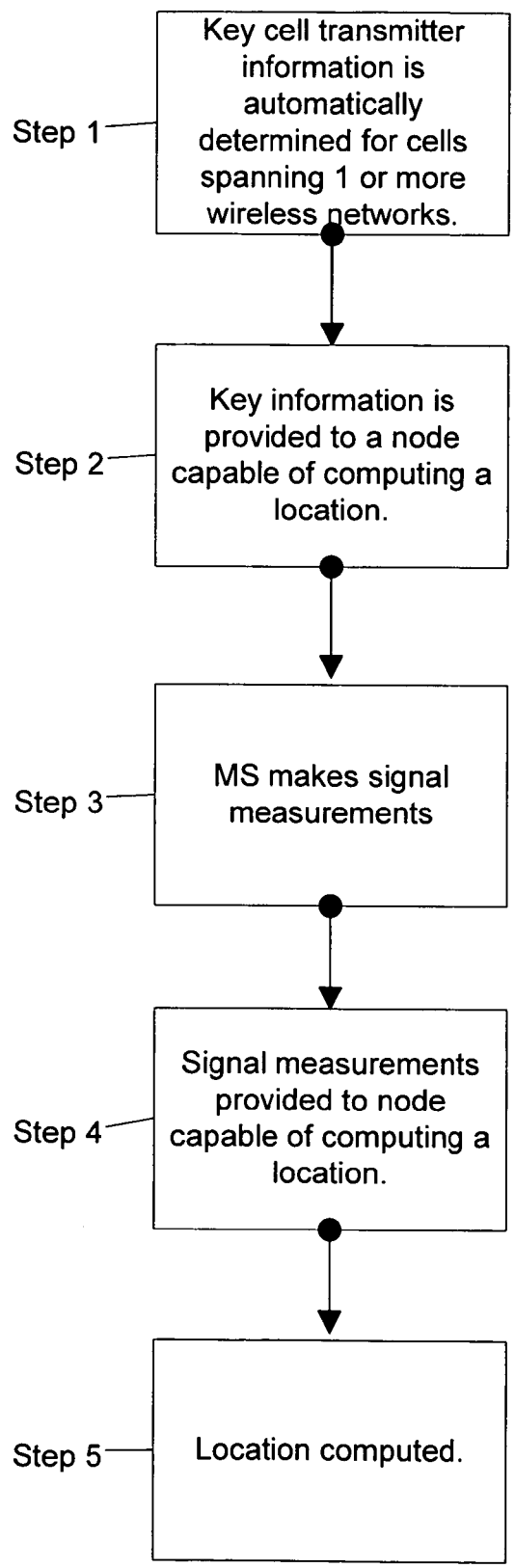
FIG. 2 is a flowchart of a process in accordance with an illustrative embodiment of the present invention.

FIG. 2 is a flowchart of a high level process embodying this location technique. The process may be described as follows:

Step 1: The key information for the base station transmitter is determined across one or more wireless networks. This key information includes:
    Cell Identification information
    Transmitter location, including latitude, longitude and altitude
    Signal timing
    Signal transmit power
    Signal propagation Step 2: This key information is provided to a node capable of computing a location. This node could be the MS, the location server, or some other node.

Step 3: MS makes measurements of transmitted signals. Signal measurements may include timing, power level measurements, or signal to noise ratio measurements.

Step 4: Signal measurements made by the MS are provided to node capable of computing a location.

Step 5: MS location is computed.

Step 1, providing key site information, preferably includes the following: Fixed or wireless devices scan for wireless base station signals. The devices determine cell or base station identification information, and make measurements of the received base station signals, including signal timing/phase and power level. The signal measurements made by these devices are provided to a Location Node, along with the determined cell or base station identification information are provided to a node, where this information is used to determine the cell site transmitter location, cell transmitter signal timing, signal transmit power, and signal transmit power loss as a function of location.

GSM Scanning

For a GSM system as defined in the ETSI 3GPP specifications, the scanning processing could include many of the methods already used by GSM MSs to acquire downlink beacon signals, and cells within a GSM network. For example: The MS will scan each 200 kHz channel in each band it supports. At each channel, the MS tries to detect the Frequency Correction Channel (FCH) to identify downlink beacon signals and to make frequency adjustment to aid further acquisition of the downlink signals. The FCH contains a single tone signal, which appears on the downlink beacon channel at a regular interval. The channel could be detected, e.g., through a matched filter or a correlation process. The Absolute Radio Frequency Channel Number (ARFCN) for each detected FCH is useful information for future measurements. If a FCH is found, or possibly even if it is not found, the MS will attempt to detect the Synchronization Channel (SCH), which contains a frame with a known data pattern that repeats on the beacon channel at a regular interval. This signal could be detected with a matched filter or correlation techniques. The SCH contains a SCH information message that contains the Base Station Identify Code (BSIC) and the parameters T1, T2, and T3, which describe the GSM frame number. At this time, a timing measurement could be made, relative to an internal MS clock or to another measured signal. The signal power could be measured as well. This channel can be used by the MS to determine the frame timing of the beacon signal to allow further analysis of the downlink beacon signal.

Next, the MS could demodulate the Broadcast Control Channel (BCCH) to gather additional information about the cell. The BCCH contains System information messages that could be used for cell identification, as well as aid further scanning. For example, the System information Type 2, or Type 2bis message, contains the BCCH Frequency List, which contains the ARFCNs of the beacon channels of the neighbor cells. This could be used to guide the MS to the next set of channels to scan. System information Type 3 contains the Cell Identification, which can be used to identify this cell, to correlate this measurement with other measurements made by the same or different MSs, made simultaneously or at different times. System information Type 6 also contains the Cell Identification, which can be used to identify this cell, to correlate this measurement with other measurements made by the same or different MSs, made simultaneously or at different times.

Therefore, by scanning the channels, the MS is able to determine the ARFCN, the BSIC, the Cell ID, list of neighbor cell frequencies, cell timing, and received signal power.

IS-95/CDMA-2000 Scanning

A similar scanning process could be used by an IS-95 or CDMA-2000 system. For example: First the MS scans the forward link Pilot Channel. Each cell transmits the Pilot Channel, but at different time offsets relative to an absolute time. The Pilot Channel is detected by the MS through correlation or matched filter techniques. At this time, a timing measurement could be made, relative to an internal MS clock or relative to another measured signal. The signal power could be measured as well.

Once the Pilot Channel is acquired, the MS can decode the Synch Channel. The Synch Channel provides the current time of day, as well as the Long Code State and the offset applied to the Pilot Channel.

Once the MS has decoded the Synch Channel, it can decode the Paging Channel. The Paging Channel contains the System Parameters Message, which contains the Base Station ID. The Paging Channel also contains the Neighbor List message, which defines the set of channels and Pilot Channel offsets the MS can use to search for neighbor cells.

UMTS Scanning

A similar scanning process can be used in a UMTS system, as is used in an IS-95/CDMA 2000 system. For example: First the UE acquires the Primary Synchronization Channel. The Primary synchronization channel is common to all cells and transmits the Primary Synchronization Code (PSC). The channel can be acquired through matched filter or correlation techniques.

Once the LE has acquired the PSC, it is able to able to acquire the Secondary Synchronization Channel (S-SCH). The S-SCH allows the UE to determine frame synchronization, and to identify the scrambling code used for the BCCH for that cell. At this time, a timing measurement could be made, relative to an internal MS clock or to another measured signal. The signal power could be measured as well.

Once the scrambling code is determined for the cell, the UE is able to de-spread the Broadcast Physical Channel, and obtain system information form the BCCH. The BCCH contains cell identification information as well as neighbor cell information.

The scanning process may repeat, or particular mobiles may be asked to re-scan all channels, or particular channels to improve the reliability and accuracy of the measurements.

The scanning technique in general is common to all air interfaces, and is not limited to the air interfaces specifically discussed herein, but apply to WiFi, WiMAX, WiBro, and other air interfaces, whether currently used or defined in the future. The scanning may be performed by mobile devices (MSs) where the location of the device is unknown, or by fixed devices, such as Mobile Stations or Location Measurement Units (LMUs) deployed in known locations.

The measurements and information determined from the MS scanning are provided to a node, which uses this to determine the remaining key cell site information, including cell transmitter locations, cell transmitter timing, cell transmit power, and signal propagation.

Determination of Key Cell Site Information

For a location system based on downlink timing measurements, the additional key information includes transmitter position and transmitter timing. This key information can be derived as explained below.

Figure 3:
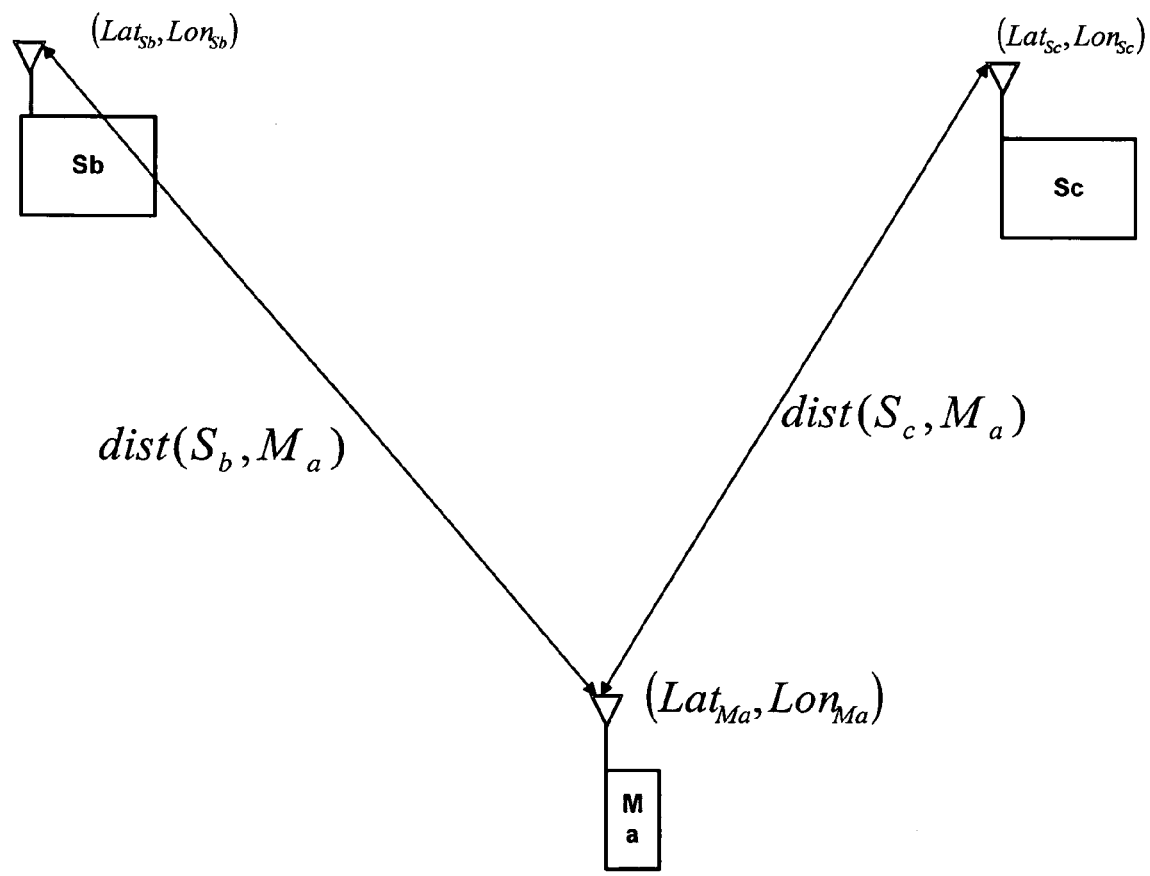
FIG. 3 is a block diagram referenced below in explaining how the location of a mobile station (MS) may be computed using the measurements and base station parameters acquired in accordance with the present invention.

FIG. 3 shows a simple two-transmitter, one-receiver scenario, with cell transmitters $S_c$ and $S_b$ along with a single mobile station $M_a$.

In this scenario, OTDmeas$_{a,b,c}$ represents the measured time difference of arrival of signals from transmitter sites $S_c$ and $S_b$ to the mobile station $M_a$.

Toff$_b$ is the time offset of cell site transmitter $S_b$, relative to some absolute time.

Toff$_c$ is the time offset of cell site transmitter $S_c$, relative to some absolute time.

(Lat$_{Ma}$,Lon$_{Ma}$) are potential coordinates for a mobile station measurement $M_a$.

(Lat$_{Sb}$,Lon$_{Sb}$) are potential coordinates of cell site transmitter $S_b$.

(Lat$_{Sc}$,Lon$_{Sc}$) are potential coordinates of cell site transmitter $S_c$.

c is the velocity of propagation of an electromagnetic wave in air (or a vacuum).

An error is computed for each OTD measurement, by computing the difference between the measured time difference (OTDmeas) and the theoretical time difference (OTDtheor), assuming a given position for each cell site transmitter (Lat$_{Sb}$, Lon$_{Sb}$) and (Lat$_{Sc}$,Lon$_{Sc}$), a position from which the mobile station measurement is made (Lat$_{Ma}$,Lon$_{Ma}$), and a time offset Toff$_b$ and Toff$_c$ for each site.

$$\text{Error}_{a,b,c} = \text{OTDtheor}_{a,b,c} - \text{OTDmeas}_{a,b,c}$$

Where $$OTDtheor_{a,b,c} = \frac{1}{c} * [dist(S_c, M_a) - dist(S_b, M_a)] + Toff_b - Toff_c$$

Where
$dist(S_x, M_y)$
is the distance between cell site antenna $S_x$ and MS $M_y$.

Many such measurements are made by many MSs for many sites. A combined error function is created from the set of errors for all the measurements. This could be a sum of square errors, weighted square errors or some other function. The weighted square error function would be:

$$\text{Error}(\underline{Lat}_S, \underline{Lon}_S, \underline{Lat}_M, \underline{Lon}_M, \underline{Toff}) = \sum_{AllMeasurements} \frac{1}{\sigma_{a,b,c}} (OTHtheor_{a,b,c} - OTDmeas_{a,b,c})^2$$

Where
$\underline{Lat}_S, \underline{Lon}_S, \underline{OTDoff}$
are vectors which describe the coordinates and time offsets for the full set of cell site transmitters, and
$\underline{Lat}_M, \underline{Lon}_M$
are vectors which describe the coordinates of the MSs for the full set of measurements.

It may be possible that some of the devices making measurements have a clock which is synchronized to some known time base, such as GPS time. For those devices, and absolute Time of Arrival (TOA) can be made for individual signals, rather than observed time differences. In this case the error function is explained:

$TOAmeas_{a,b}$ is the measured time of a signal from transmitter $S_b$ arriving d at mobile station $M_a$.

Then, an error is computed for each measurement, by computing the difference between the measured time of arrival (TOAmeas) and the theoretical time of arrival (TOAtheor), assuming a given position for the cell site transmitter ($Lat_{Sb}$, $Lon_{Sb}$) and a position from which the mobile station measurement is made ($Lat_{Ma}, Lon_{Ma}$), and a time offset $Toff_b$ for the site.

$$\text{Error}_{a,b} = TOAtheor_{a,b} - TOAmeas_{a,b}$$

Where $$TOAtheor_{a,b} = \frac{1}{c} * [dist(S_b, M_a)] - Toff_b$$

The combined error function for a system using absolute time of arrival measurements would be:

$$\text{Error}(\underline{Lat}_S, \underline{Lon}_S, \underline{Lat}_M, \underline{Lon}_M, \underline{Toff}) = \sum_{AUTOAMeasurements} \frac{1}{\sigma_{a,b}} (TOAtheor_{a,b} - TOAmeas_{a,b})^2$$

Or, if there are a combination of mobile stations with some making time of arrival measurements, and others making time difference of arrival measurements, the error function would be:

$$\text{Error}(\underline{Lat}_S, \underline{Lon}_S, \underline{Lat}_M, \underline{Lon}_M, \underline{Toff}) = \sum_{AUTOAMeasurements} \frac{1}{\sigma_{a,b}} (TOAtheor_{a,b} - TOAmeas_{a,b})^2 + \sum_{AlOTDlMeasurements} \frac{1}{\sigma_{a,b,c}} (OTHtheor_{a,b,c} - OTDmeas_{a,b,c})^2$$

In this example, the appropriate error function is then minimized over the possible set of coordinates for each cell site transmitter, the possible set of coordinates of the MS for each measurement, and the possible values for transmitter time offsets. This set produces the least squared error. The invention is not limited to a least squares error function. Other error functions could be used.

Each of the time difference measurements is information that can be used to solve for all of the unknown variables. If the total number of time difference measurements is greater than the total number of unknown variables, then the measurements can provide for a unique solution for each variable. In addition, if there are many more measurements than unknown variables, the system is over determined, and a solution is also possible, with the advantage that the effects of individual measurement errors will be reduced.

For example, each MS could make 10 OTD measurements per measurement attempt on average. This error function could become quite complex, as there may be more than 1000 cells in a large network, and more than 100,000 MS measurement attempts required to obtain a highly over determined measurement of the system. In this example, there would be on the order of one million OTD measurement errors (~10 per measurement attempt), which would be optimized over about 203,000 unknown variables, which include the latitude and longitude for each of the 100,000 measurement attempts, and the latitude and longitude and time offset value for each of 1000 cell site transmitters. This would be a very large non-linear function to minimize, but is not an intractable problem, and can be solved with today's computers. Setting the error function to a value of zero produces a very large non-linear equation to solve. Many available articles and books provide methods for solving non-linear equations.

For the above error functions to provide valid values of the unknowns, the time offset of the cell site transmitters must have a small variation during the time the measurements are made and used. Often this is the case as the base station transmitter timing is based on communication links back to a central office, which are ultimately all connected to a very stable time base. The stability of the time base will limit the amount of time a given set of time offsets are valid. In addition, the variation of the time offsets may be modeled as a function of time; for example, as a linear function of time modeled as an offset plus a drift rate multiplied by a time difference. This model, which is more complex than a single offset, would create an additional variable to solve, such as a time drift rate, but could provide time offset measurements, which are valid, for a longer period of time, improving accuracy.

This process can be greatly simplified as some of this information may already be known. For example, many of the MSs may have an accurate position determined with a GPS or other location capability when making measurements, or the devices may be fixed at known locations and act as Location Measurement Units, such as those defined in the 3GPP Technical Specifications. In the above example, the same error function could be used, but the number of unknown variables would be reduced by 200,000, because the cell site transmitter variables were determined using only measurements from MSs or LMUs that have an accurate GPS or otherwise have a known position.

Another example of simplification is that some of the cell site coordinates are known. This might be the case if the system is deployed with cooperation of one or more wireless operators that provide the cell position information, while sites from one or more additional operators which do not provide the cell coordinates are used. In this case, the example above could be reduced by 1000 variables if half (½) of the original 1000 cells have known coordinates.

A further simplification that dramatically helps the real time performance is that the positions of the cell site antennas do not vary with time. Once a set of cell transmitter positions is established, it can be assumed to be correct in the future, and need not be solved for in real time on a frequent basis. Logic can be put in place which periodically checks for new cell site IDs, or identifies particular cell site transmitters where measurements of the signal from that site are particularly inaccurate, possibly indicating the coordinates are wrong. The coordinates for this new cell or cells with incorrect coordinates can be determined within the method described above, with MS measurements with known or unknown coordinates, and with the coordinates of nearby sites also known.

For some systems, such as GSM and UMTS WCDMA systems, the cell site transmitters are typically not synchronized. However, in IS-95 and CDMA 2000 systems, the cell site transmitters are synchronized, or in some cases the cell transmitters in a GSM or UMTS system could be synchronized. In the synchronized case, the time offset can be assumed constant, or measured infrequently, and then assumed to be stable over long periods of time, similar to the assumptions which could be made about the cell site positions.

The problem can also be reduced to smaller sets of mobile measurements, and cell site transmitters in a particular area. This smaller set of unknowns and measurements would be used to solve for subsets of the variables, which are later combined to create a full solution. For example, this method could be used to solve for the key information for just one cell transmitter at a time. In this case, only a first set of MS measurements involving the particular cell site transmitter of interest, as well as any cell site transmitters reported by the set of MSs which are reported, would be included in the solution. Optionally, any additional MS measurement that includes any of the cell site transmitters found in the first set of measurements could be included. In this case, the solution would be limited to a smaller geographic area, perhaps including only 10-20 cell transmitters, and 100-200 MS measurements, a much smaller set when compared to the first example. Then, the key information for the single transmitter is determined and tagged as known. Thereafter, the same process repeats on a second cell in this original set, but using the known information of the first cell, in the solution of the information of the second cell, as well as all MS measurements which include this second cell. This entire process would then be repeated on a $3^{rd}$ and $4^{th}$ cell, each time using the known information for the previous cells, until the key information for all cells is determined. This process could be generalized to select subsets of MS measurements and cell transmitters included in these measurements to solve for subsets of the unknown information that are then marked as known, and can be used in the solution of subsequent subsets of unknown information.

3GPP Technical Specification 44.031 defines the parameters needed by the MS to make time difference measurements, as well as the set of cell transmitter information required to perform an EOTD location. This includes the cell transmitter ARFCN, the Cell ID, the BSIC, the frame timing information, and the transmitter location. The above procedures automatically determine all of the information. Along with the measurements made by the MS to be located, all information is available to perform an EOTD location.

The IS-95 and CDMA 2000 technical specifications define the parameters needed to perform an AFLT location. This includes the Pilot PN offsets, the transmitter locations, and the radio channel numbers. The above procedures automatically determine all of the information. Along with the measurements made by the MS to be located, all information is available to perform an AFLT location.

3GPP Technical Specification 25.331 defines the parameters needed by the UE to make time difference measurements, as well as the set cell transmitter information required to perform and OTD location in a UMTS network. This includes the cell transmitter, frequency channel, the cell identification information, the frame timing information, and the transmitter location. The above procedures automatically determine all of the information. Along with the measurements made by the UE to be located, all information is available to perform an OTD location.

This system may be implemented with a user plane or Secure User Plane (SUPL) connection between the MS and the location server as defined by OMA. The MS and the location server are connected by an IP connection, which is provided by a cellular wireless operator, through an 802.11 WiFi network, or even through a wired connection. In a user plane solution, an application running on the MS could perform the signal measurements when commanded by the server through the IP connection, and report the results of these measurements through the IP connection. The advantage of a user plane implementation is that it does not require a wireless operator to place additional features and infrastructure into the wireless network to support location related messaging between the MS and the location server.

CONCLUSION

The true scope the present invention is not limited to the illustrative embodiments disclosed herein. For example, the foregoing disclosure of a Wireless Location System (WLS) uses explanatory terms, such as wireless device, mobile station, client, network station, and the like, which should not be construed so as to limit the scope of protection of this application, or to otherwise imply that the inventive aspects of the WLS are limited to the particular methods and apparatus disclosed. For example, the terms LDP Device and LES are not intended to imply that the specific exemplary structures depicted in FIGS. 1 and 2 must be used in practicing the present invention. A specific embodiment of the present invention may utilize any type of mobile wireless device as well as any type of server computer that may be programmed to carry out the invention as described herein. Moreover, in many cases the place of implementation (i.e., the functional element) described herein is merely a designer's preference and riot a requirement. Accordingly, except as they may be expressly so limited, the scope of protection is not intended to be limited to the specific embodiments described above.

The invention claimed is:

1. A system for automatically collecting and storing key cell transmitter information for use in locating a mobile wireless device operating in a wireless communications network (WCN), wherein the WCN includes a network of base stations including base station transmitters configured to transmit broadcast signals in one or more prescribed wireless frequency bands, wherein the broadcast signals from different base station transmitters are not synchronized with one another, comprising:

a location processing node configured to determine key transmitter information concerning base station transmitters of the WCN, wherein said key transmitter information is determined using information automatically determined by wireless scanning devices;

a plurality of wireless scanning devices, wherein each of said wireless scanning devices is configured to communicate with said location processing node via a communications link, and to scan available wireless bands and to make scanning measurements of unsynchronized base station broadcast signals from one or more geographically distributed base station transmitters of the WCN, wherein each wireless scanning device is further configured to assist the location processing node in determining said key transmitter information, including cell identification information, cell transmitter location information, and cell transmitter signal timing information, by receiving and measuring characteristics of said signals and providing information about said characteristics via the communications link to said location processing node; and a location server configured to communicate with a mobile station (MS) to be located, and to cause said MS to be located to make signal measurements of signals from one or more WCN cell transmitters and to provide measurement information, including signal timing and received power level, to said location processing node;

wherein the system is configured such that, once a set of cell transmitter positions is established, these positions are assumed to be correct in the future and are not solved for on a frequent basis, and wherein the system periodically checks for new cell identification information and determines the coordinates for new cell transmitters.

2. A system as recited in claim 1, wherein each said wireless scanning device is further configured to communicate said key transmitter information to said location processing node, wherein said information is used by said location processing node to compute the location of one or more wireless devices.

3. A system as recited in claim 1, wherein the system is configured to operate with said one or more transmitters, and wherein at least one transmitter is part of a first wireless communications network and a least one transmitter is part of a second wireless communications network, and each of said wireless scanning devices is configured to scan and report cell transmitter information for cell transmitters of two different wireless communications networks.

4. A system as recited in claim 1, wherein said location server is configured to communicate via a user plane data channel with each said wireless scanning device, and wherein each said wireless scanning device is configured to provide measurement information via the data channel to said location processing node.

5. A system as recited in claim 1, wherein said cell identification information includes at least one member of the group consisting of Cell ID, frequency channel, base station identity code, Cell Global Identity, and Base Station ID.

6. A system as recited in claim 1, wherein said cell transmitter location information includes latitude and longitude.

7. A system as recited in claim 1, wherein said signal measurements include relative signal timing.

8. A system as recited in claim 1, wherein said signal measurements include absolute signal timing.

9. A system as recited in claim 1, wherein said signal measurements include received power level.

10. A system as recited in claim 1, wherein said location processing node is programmed to compute a location solution based upon time difference measurements.

11. A system as recited in claim 1, wherein at least one of said wireless scanning devices is a mobile device.

12. A system as recited in claim 1, wherein at least one of said wireless scanning devices is a fixed device.

13. A system as recited in claim 1, wherein at least one of said wireless scanning devices is at a known location.

14. A system as recited in claim 1, wherein at least one of said wireless scanning devices is at an unknown location.

15. A system as recited in claim 1, wherein said location processing node is programmed to compute a location solution using said measurements and previously known information to solve for unknown information.

16. A system as recited in claim 1, wherein said location processing node is programmed to compute an error function based on known and unknown information, and to solve for the unknown information by minimizing the error function.

17. A system as recited in claim 16, wherein said location processing node is programmed to compute the error of each of the measurements as a function of the unknown information.

18. A system as recited in claim 17, wherein said location processing node is programmed to compute an error function for time difference measurements, wherein said error function is the difference between a measured time difference and a theoretical time difference, assuming a hypothesized set of transmitter positions, transmitter timing offsets and receiver positions.

19. A system as recited in claim 18, wherein said location processing node is programmed to compute the square error of each of the measurements based on the unknown information.

20. A system as recited in claim 19, wherein said location processing node is programmed to weight the square error of each of the measurements based on the quality of the measurement, and to sum the weighted errors to create an error value which is a function of the unknown data.

21. A system as recited in claim 20, wherein said location processing node is programmed to solve for the unknown data by minimizing the error function.

22. A system as recited in claim 21, wherein said location processing node is programmed to mark data values as known once determined, and to use the known values to simplify the solution of unknown information.

23. A system as recited in claim 22, wherein the known information includes previously determined transmitter position information.

24. A system as recited in claim 22, wherein the known information includes timing of a transmitter known to be synchronous with respect to a common timing source.

25. A system as recited in claim 22, wherein the known information includes positions of fixed receivers.

26. A system as recited in claim 22, wherein the known information includes positions of mobile receivers.

27. A system as recited in claim 15, wherein said location processing node is programmed to limit a portion of the location solution to a geographic region, and to then later combine the data from various regions to simplify solution of the unknown data.

28. A system as recited in claim 1, wherein said location processing node comprises a computer.

29. A system as recited in claim 1, wherein said location processing node comprises a wireless device.

30. A system as recited in claim 1, wherein the WCN is compliant with at least one technical standard, including at least one of GSM, UMTS, IS-95, and CDMA-2000, wherein each said wireless scanning device is further configured to communicate said key transmitter information to said location processing node, wherein said information is usable by said location processing node to compute the location of one or more wireless devices; wherein said server is configured to communicate via a user plane data channel with each wireless scanning device, and wherein said MS to be located is configured to provide measurement information via the data channel to said location processing node.

31. A method for locating a mobile station (MS), comprising:
  instructing at least one wireless scanning device to communicate with a location processing node via a communications link, and to make scanning measurements of broadcast signals from one or more unsynchronized, geographically distributed transmitters, and further instructing said at least one wireless scanning device to receive and measure characteristics of said signals and provide information about said characteristics via the communications link to said location processing node, wherein said characteristics are useful to determine key transmitter information;
  instructing a MS to be located to make signal measurements of signals from one or more transmitters and to provide measurement information to said location processing node;
  determining the key transmitter information using information automatically determined by the wireless scanning device(s), said key transmitter information including cell identification information, cell transmitter position information, and cell transmitter signal timing information;
  periodically checking for new cell identification information and determining the coordinates for new cell transmitters; and
  at the location processing node, using said key transmitter information and said measurement information to determine the geographic location of said MS to be located;
  wherein the method is performed such that, once a set of cell transmitter positions is established, these positions are assumed to be correct in the future and are not solved for on a frequent basis.

32. A method as recited in claim 31, comprising instructing said at least one wireless scanning device to communicate said key transmitter information to said location processing node, wherein said information is used by said location processing node to compute the location of one or more wireless devices.

33. A method as recited in claim 31, wherein the method is performed with at least one transmitter of a first wireless communications network and a least one transmitter of a second wireless communications network.

34. A method as recited in claim 31, wherein communications between one or more wireless devices and said location processing node are conducted via a user plane data channel.

35. A method as recited in claim 31, wherein said key transmitter information includes cell identification information.

36. A method as recited in claim 35, wherein said cell identification information includes at least one member of the group consisting of Cell ID, frequency channel, base station identity code, Cell Global Identity, and Base Station ID.

37. A method as recited in claim 31, wherein said key transmitter information includes cell transmitter location information.

38. A method as recited in claim 37, wherein said cell transmitter location information includes latitude and longitude.

39. A method as recited in claim 31, wherein said key transmitter information includes cell transmitter signal timing information.

40. A method as recited in claim 31, wherein said signal measurements include relative signal timing.

41. A method as recited in claim 31, wherein said signal measurements include absolute signal timing.

42. A method as recited in claim 31, wherein said signal measurements include received power level.

43. A method as recited in claim 31, wherein said location processing node is programmed to compute a location solution based upon time difference measurements.

44. A method as recited in claim 31, wherein said at least one wireless scanning device is a mobile device.

45. A method as recited in claim 31, wherein said at least one wireless scanning device is a fixed device.

46. A method as recited in claim 31, wherein said at least one wireless scanning device is at a known location.

47. A method as recited in claim 31, wherein said at least one wireless scanning device is at an unknown location.

48. A method as recited in claim 31, wherein said location processing node is programmed to compute a location solution using said measurements and previously known information to solve for unknown information.

49. A method as recited in claim 31, wherein said location processing node is programmed to compute an error function based on known and unknown information, and to solve for the unknown information by minimizing the error function.

50. A method as recited in claim 49, wherein said location processing node is programmed to compute the error of each of the measurements as a function of the unknown information.

51. A method as recited in claim 50, wherein said location processing node is programmed to compute an error function for time difference measurements, wherein said error function is the difference between a measured time difference and a theoretical time difference, assuming a hypothesized set of transmitter positions, transmitter timing offsets and receiver positions.

52. A method as recited in claim 51, wherein said location processing node is programmed to compute the square error of each of the measurements based on the unknown information.

53. A method as recited in claim 52, wherein said location processing node is programmed to weight the square error of each of the measurements based on the quality of the measurement, and to sum the weighted errors to create an error value which is a function of the unknown data.

54. A method as recited in claim 53, wherein said location processing node is programmed to solve for the unknown data by minimizing the error function.

55. A method as recited in claim 54, wherein said location processing node is programmed to mark data values as known once determined, and to use the known values to simplify the solution of unknown information.

56. A method as recited in claim 55, wherein the known information includes previously determined transmitter position information.

57. A method as recited in claim 55, wherein the known information includes timing of a transmitter known to be synchronous with respect to a common timing source.

58. A method as recited in claim 55, wherein the known information includes positions of fixed receivers.

59. A method as recited in claim 55, wherein the known information includes positions of mobile receivers.

60. A method as recited in claim 48, wherein said location processing node is programmed to limit a portion of the location solution to a geographic region, and to then later combine the data from various regions to simplify solution of the unknown data.

61. A method as recited in claim 31, wherein said location processing node comprises a computer.

62. A method as recited in claim 31, wherein said location processing node comprises a wireless device.

63. A method as recited in claim 31, wherein said at least one wireless scanning device is further instructed to communicate said key transmitter information to said location processing node, wherein said information is used by said location processing node to compute the location of one or more wireless devices; wherein said wireless devices are operative to communicate via a user plane data channel, and wherein said MS to be located is operative to provide measurement information via the data channel to said location processing node; wherein said key transmitter information includes cell identification information, cell transmitter location information, and cell transmitter signal timing information; and wherein said signal measurements include signal timing and received power level.

* * * * *